United States Patent
Kondoh et al.

(10) Patent No.: US 8,370,026 B2
(45) Date of Patent: Feb. 5, 2013

(54) ACTIVATION DEVICE FOR OCCUPANT PROTECTION APPARATUS AND METHOD FOR ACTIVATING THE OCCUPANT PROTECTION APPARATUS

(75) Inventors: Toshihide Kondoh, Chita-gun (JP); Takashi Noguchi, Chiryu (JP)

(73) Assignee: Denso Corporation, Kariya (JP)

( * ) Notice: Subject to any disclaimer, the term of this patent is extended or adjusted under 35 U.S.C. 154(b) by 321 days.

(21) Appl. No.: 12/660,823

(22) Filed: Mar. 4, 2010

(65) Prior Publication Data
US 2010/0228445 A1 Sep. 9, 2010

(30) Foreign Application Priority Data
Mar. 6, 2009 (JP) .................. 2009-053304

(51) Int. Cl.
| | |
|---|---|
| B60R 22/00 | (2006.01) |
| B60R 21/00 | (2006.01) |
| B60D 1/28 | (2006.01) |
| B60K 28/00 | (2006.01) |
| B60K 28/10 | (2006.01) |
| B60K 28/12 | (2006.01) |
| B60K 28/14 | (2006.01) |
| B60L 3/00 | (2006.01) |
| B60T 7/12 | (2006.01) |
| B60T 7/22 | (2006.01) |
| B62D 49/08 | (2006.01) |
| B60Q 1/00 | (2006.01) |
| E05F 15/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl. .......... 701/45; 340/436; 180/271; 180/274; 180/281; 180/282

(58) Field of Classification Search ............... 340/436; 180/271, 274, 281, 282; 701/45
See application file for complete search history.

(56) References Cited

U.S. PATENT DOCUMENTS

| | | | | |
|---|---|---|---|---|
| 5,609,358 | A * | 3/1997 | Iyoda et al. ............ | 280/735 |
| 5,969,599 | A * | 10/1999 | Wessels et al. .......... | 340/436 |
| 6,426,567 | B2 * | 7/2002 | Ugusa et al. ............ | 307/10.1 |
| 6,594,570 | B2 | 7/2003 | Nagao et al. | |
| 7,434,834 | B2 | 10/2008 | Mihara et al. | |

FOREIGN PATENT DOCUMENTS

| | | |
|---|---|---|
| EP | 2196361 A1 * | 6/2010 |
| JP | 06-055996 | 3/1994 |

(Continued)

OTHER PUBLICATIONS

Office Action dated Dec. 21, 2010 in corresponding Japanese Application No. 2009-053304, and English translation thereof.

*Primary Examiner* — Ryan Zeender
*Assistant Examiner* — Allen Chein
(74) *Attorney, Agent, or Firm* — Harness, Dickey & Pierce, PLC

(57) ABSTRACT

An activation device is configured to activate a protection apparatus for protecting an occupant. The activation device includes a front collision detection unit and a rear collision detection unit. The front collision detection unit outputs a front-collision-state activation signal to a front-collision protection apparatus so as to activate the front-collision protection apparatus when detecting front collision of the vehicle. The rear collision detection unit outputs a rear-collision-state activation signal to a rear-collision protection apparatus so as to activate the rear-collision protection apparatus when detecting rear collision of the vehicle. The rear collision detection unit prohibits output of the rear-collision-state activation signal to the rear-collision protection apparatus for a first period when the front collision detection unit detects front collision of the vehicle.

14 Claims, 6 Drawing Sheets

FOREIGN PATENT DOCUMENTS

| | | |
|---|---|---|
| JP | 2001-247009 | 9/2001 |
| JP | 2002-283949 | 10/2002 |
| JP | 2005-254921 | 9/2005 |
| JP | 2005-280380 | 10/2005 |
| JP | 2006-082731 | 3/2006 |
| JP | 2006-193036 | 7/2006 |

* cited by examiner

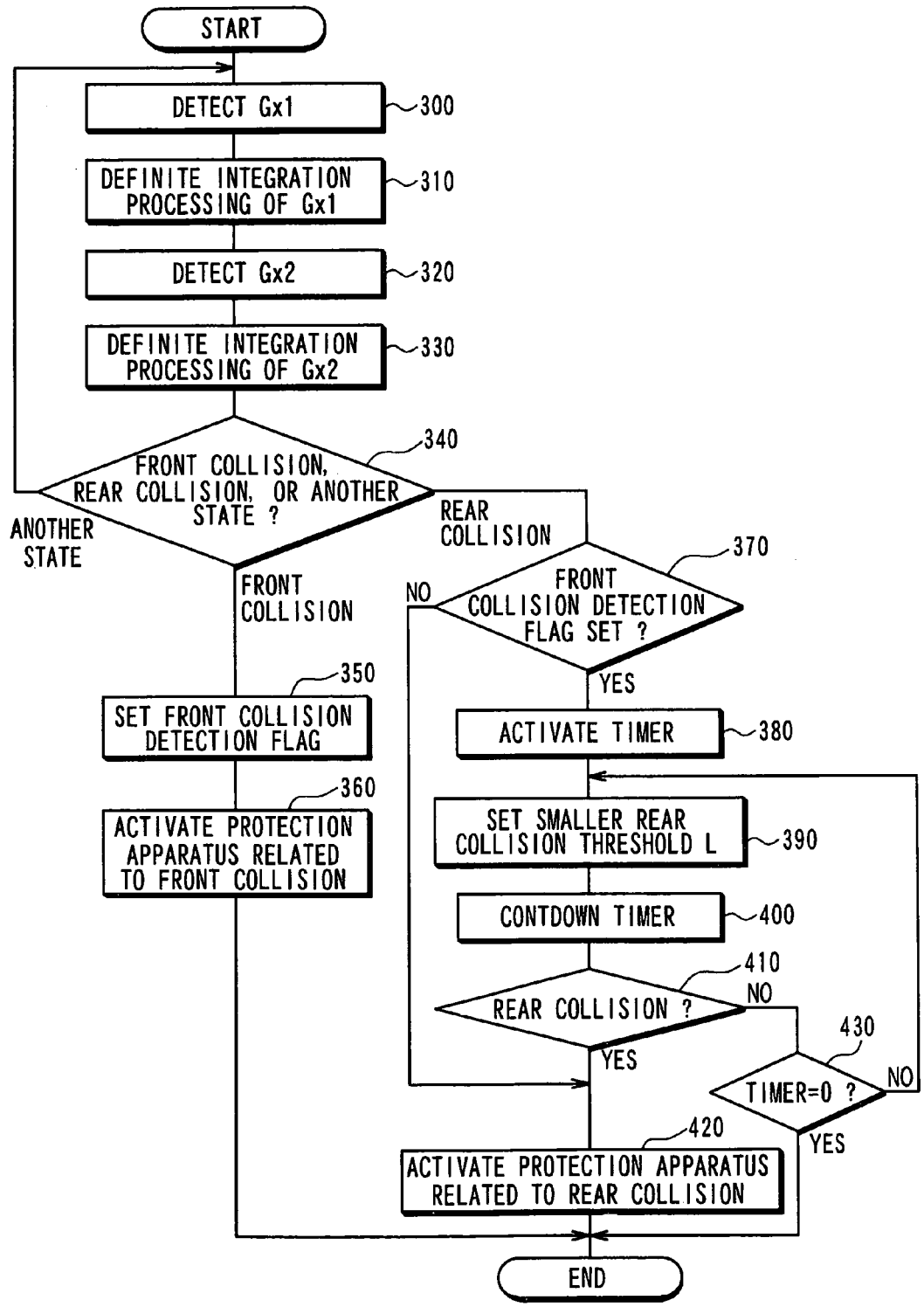

ACTIVATION DEVICE FOR OCCUPANT PROTECTION APPARATUS AND METHOD FOR ACTIVATING THE OCCUPANT PROTECTION APPARATUS

CROSS REFERENCE TO RELATED APPLICATIONS

This application is based on and incorporates herein by reference Japanese Patent Application No. 2009-53304 filed on Mar. 6, 2009.

FIELD OF THE INVENTION

The present invention relates to an activation device for an occupant protection apparatus for protecting an occupant when a vehicle causes front collision and rear collision. The present invention further relates to a method for activating the occupant protection apparatus.

BACKGROUND OF THE INVENTION

For example, JP-A-3378883 discloses an occupant protection apparatus for a vehicle having an enhanced protection performance for an occupant when the vehicle causes multiple collision. Specifically, according to JP-A-3378883, the occupant protection apparatus activates a pre-tensioner when the vehicle causes collision. Further, the occupant protection apparatus continues activation of the pre-tensioner for a period, in which the vehicle possibly causes multiple collision, without deactivating the pre-tensioner. The occupant protection apparatus of JP-A-3378883 continues activation of the pre-tensioner when the vehicle causes collision. It is noted that, the vehicle possibly cause both front collision and rear collision in multiple collision. Accordingly, an occupant protection apparatus related to front collision and another occupant protection apparatus related to rear collision are desirably activated separately with respect to front collision and rear collision.

In JP-A-3378883, the occupant protection apparatus (pre-tensioner) related to rear collision is activated when the vehicle causes front collision in multiple collision. Accordingly, in multiple collision, the pre-tensioner is already activated when the vehicle further causes rear collision subsequent to the front collision. Accordingly, the pre-tensioner may not be appropriately activated when the vehicle causes the subsequent rear collision, even though the pre-tensioner is desirably activated in the rear collision. Therefore, erroneous activation of the occupant protection apparatus related to rear collision needs to be avoided when the vehicle causes front collision.

In general, in multiple collision, the vehicle first collides another vehicle running in front of the vehicle to cause front collision, and subsequently, the vehicle is collided by another vehicle running from the behind of the vehicle to cause rear collision. Accordingly, an occupant protection apparatus related to rear collision needs to be steadily activated subsequent to front collision.

SUMMARY OF THE INVENTION

In view of the foregoing and other problems, it is an object of the present invention to produce an activation device for an occupant protection apparatus, the activation device configured to reduce erroneous activation of an occupant protection apparatus related to rear collision when a vehicle causes front collision It is another object of the present invention to produce an activation device for an occupant protection apparatus, the activation device configured to steadily activate an occupant protection apparatus when the vehicle possibly causes rear collision subsequent to front collision of the vehicle. It is another object of the present invention to produce a method for activating the occupant protection apparatus.

According to one aspect of the present invention, an activation device for detecting collision of a vehicle and activating a protection apparatus for protecting an occupant, the activation device comprises a front collision detection unit configured to detect front collision of the vehicle and output a front-collision-state activation signal to a protection apparatus related to front collision so as to activate the protection apparatus related to front collision when detecting front collision. The activation device further comprises a rear collision detection unit configured to detect rear collision of the vehicle, output a rear-collision-state activation signal to a protection apparatus related to rear collision so as to activate the protection apparatus related to rear collision when detecting rear collision, and prohibit output of the rear-collision-state activation signal to the protection apparatus related to rear collision for a first period when the front collision detection unit detects front collision.

According to another aspect of the present invention, an activation device for detecting collision of a vehicle and activating a protection apparatus for protecting an occupant, the activation device comprises a front collision detection unit configured to detect front collision of the vehicle and output a front-collision-state activation signal to a protection apparatus related to front collision so as to activate the protection apparatus related to front collision when detecting front collision. The activation device further comprises a rear collision detection unit configured to detect rear collision of the vehicle, output a rear-collision-state activation signal to a protection apparatus related to rear collision so as to activate the protection apparatus related to rear collision when detecting rear collision, and ease detection of rear collision for a predetermined period when the front collision detection unit detects front collision.

According to another aspect of the present invention, a method for activating a protection apparatus for protecting an occupant, the method comprises detecting front collision of the vehicle. The method further comprises detecting rear collision of the vehicle. The method further comprises outputting a front-collision-state activation signal to a protection apparatus related to front collision so as to activate the protection apparatus related to front collision when detecting front collision. The method further comprises outputting a rear-collision-state activation signal to a protection apparatus related to rear collision so as to activate the protection apparatus related to rear collision when detecting rear collision and when the outputting is not prohibited. The method further comprises prohibiting the outputting of the rear-collision-state activation signal for a first period when detecting front collision.

According to another aspect of the present invention, a method for activating a protection apparatus for protecting an occupant, the method comprises detecting front collision of the vehicle. The method further comprises detecting rear collision of the vehicle. The method further comprises outputting a front-collision-state activation signal to a protection apparatus related to front collision so as to activate the protection apparatus related to front collision when detecting front collision. The method further comprises outputting a rear-collision-state activation signal to a protection apparatus related to rear collision so as to activate the protection apparatus related to rear collision when detecting rear collision. The method further comprises easing detection of rear collision of the vehicle for a predetermined period when detecting front collision.

BRIEF DESCRIPTION OF THE DRAWINGS

The above and other objects, features and advantages of the present invention will become more apparent from the following detailed description made with reference to the accompanying drawings. In the drawings:

FIG. 6 is a flowchart showing an operation of the activation device according to the second embodiment

DETAILED DESCRIPTION OF PREFERRED EMBODIMENTS

First Embodiment

As follows, the first embodiment will be described with reference to drawings. According to the present embodiment, an activation device for an occupant protection apparatus is, for example, used for activating an occupant protection apparatus such as an air back apparatus of a vehicle. Specifically, the activation device is configured to activate the occupant protection apparatus in response to front collision caused by the vehicle or rear collision caused to the vehicle.

The front collision is caused by the vehicle when colliding another vehicle running in front of the vehicle. The rear collision is caused when the vehicle is collided by another vehicle running from the behind of the vehicle.

Figure 1:
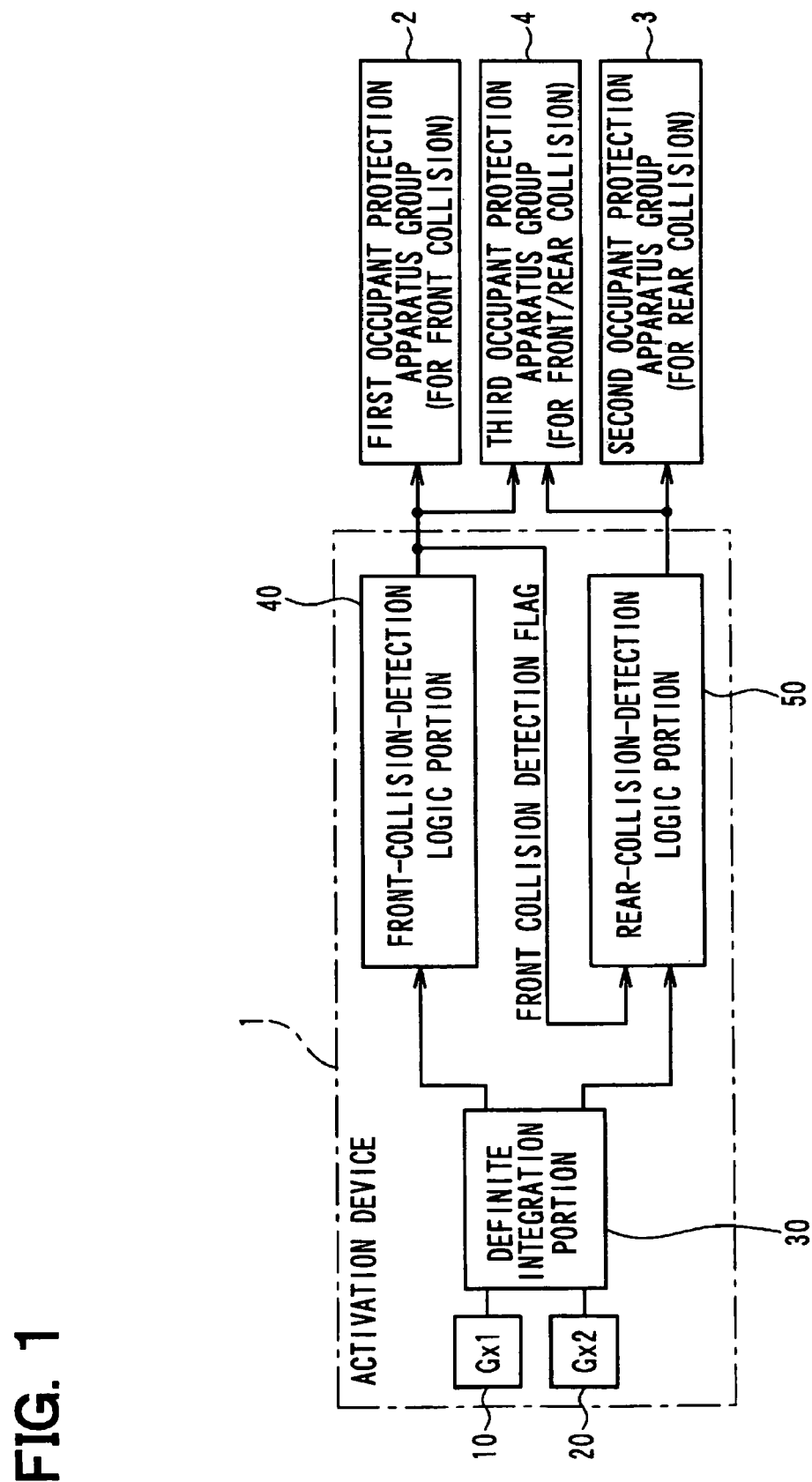
FIG. 1 is a block diagram showing an occupant protection system having an activation device for an occupant protection apparatus according to a first embodiment.

FIG. 1 is a block diagram showing an occupant protection system having the activation device for the occupant protection apparatus according to the present embodiment. As shown in FIG. 1, the occupant protection system includes an activation device 1 for the occupant protection apparatus, a first occupant protection apparatus group 2, a second occupant protection apparatus group 3, and a third occupant protection apparatus group 4.

The activation device 1 activates each of the first to third occupant protection apparatus groups 2 to 4 so as to protect an occupant of the vehicle from front collision and rear collision. The activation device 1 includes a first acceleration sensor 10, a second acceleration sensor 20, a definite integration portion 30, a front-collision-detection logic portion 40, and a rear-collision-detection logic portion 50.

Each of the first acceleration sensor 10 and the second acceleration sensor 20 are formed as, for example, a microelectromechanical system (MEMS) device for generating a detection signal according to change in acceleration applied to the vehicle.

The first acceleration sensor 10 detects acceleration of the vehicle in a front direction as a front acceleration (Gx1). In this example, the front direction of the vehicle is defined as a first detection direction. The first acceleration sensor 10 detects acceleration in the first detection direction. In movement of the vehicle in the front direction, the first acceleration sensor 10 detects a positive value of a detection signal when detecting front acceleration in the first detection direction.

The second acceleration sensor 20 detects acceleration of the vehicle in a rear direction as a rear acceleration (Gx2). In this example, the rear direction of the vehicle is defined as a second detection direction. The second acceleration sensor 20 detects acceleration in the second detection direction. In movement of the vehicle in the front direction, the second acceleration sensor 20 detects a negative value of a detection signal when detecting rear acceleration in the second detection direction. The second detection direction is opposite to the first detection direction. Therefore, a waveform of front acceleration detected by the first acceleration sensor 10 and a waveform of rear acceleration detected by the second acceleration sensor 20 has a reversed relationship in positive and negative values.

Each of the acceleration sensors 10 and 20 includes, for example, a silicon substrate having a generally known comb-teeth structure including beam members. Each of the acceleration sensors 10 and 20 includes a movable electrode and a stationary electrode therebetween having an electric capacity. The electric capacity is changeable according to detected acceleration applied to the sensor. Each of the acceleration sensors 10 and 20 performs a capacitance to voltage conversion (C-V conversion) so as to obtain an electric signal according to change in an electric capacity. Thus, the first acceleration sensor 10 outputs a front detection signal, and the second acceleration sensor 20 outputs a rear detection signal.

The definite integration portion 30 inputs the front detection signal and the rear detection signal respectively from the acceleration sensors 10 and 20 and performs a definite integration processing of each of the detection signals in a predetermined period. In this, way, the definite integration portion 30 obtains a front acceleration detection result and a rear acceleration detection result respectively based on the front detection signal and the rear detection signal. Each of the front acceleration detection result and the rear acceleration detection result is a definite integral value. As described above, the detection direction of acceleration of the first acceleration sensor 10 is opposite to the detection direction of acceleration of the second acceleration sensor 20. Therefore, the definite integration value showing the front acceleration detection result and the definite integration value showing the rear acceleration detection result are of opposite sign. The definite integration portion 30 outputs the result of the definite integration processing to the front-collision-detection logic portion 40 and the rear-collision-detection logic portion 50.

The front-collision-detection logic portion 40 inputs the front acceleration detection result and the rear acceleration detection result from the definite integration portion 30 and determines existence of front collision of the vehicle based, on the detection results. The front-collision-detection logic portion 40 has a first front collision threshold (ThFGx1) and a second front collision threshold (ThFGx2) for determining the front collision. The first front collision threshold (ThFGx1) corresponds to the front acceleration detection result, and the second front collision threshold (ThFGx2) corresponds to the rear acceleration detection result.

Figure 2:
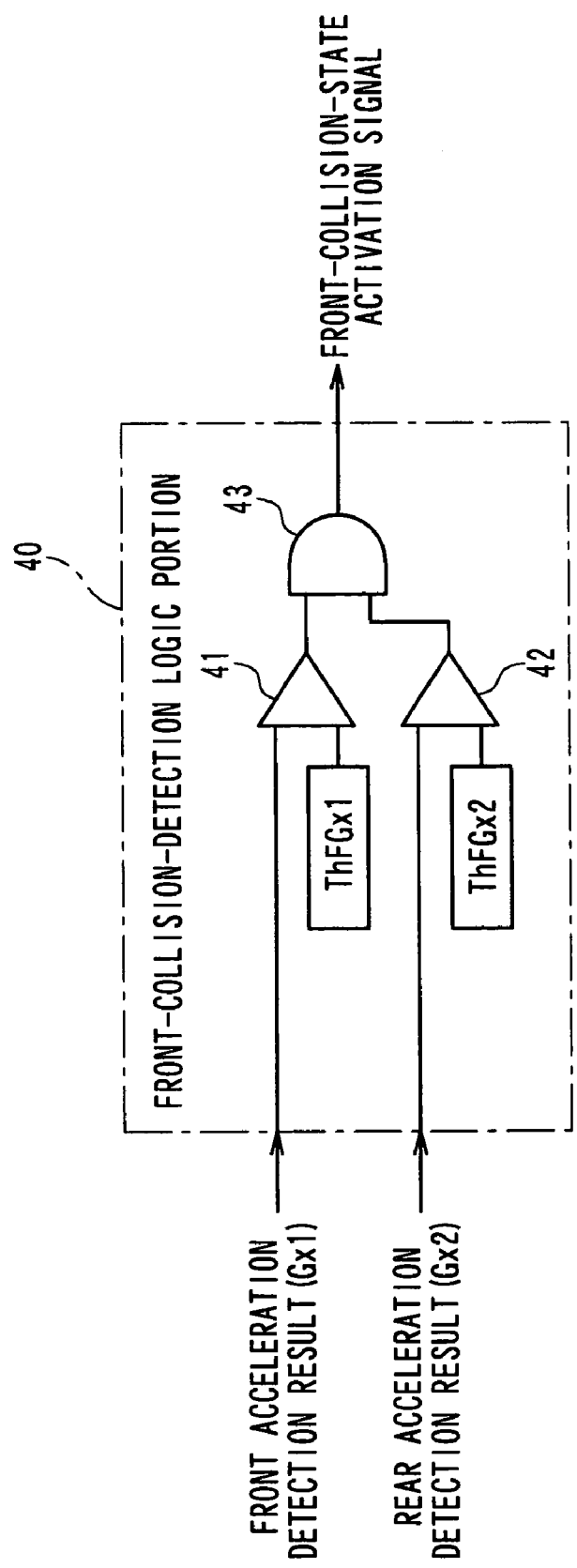
FIG. 2 is a diagram showing a front-collision-detection logic portion.

FIG. 2 is a diagram showing the front-collision-detection logic portion 40. The front-collision-detection logic portion 40 includes two comparators 41 and 42 and an AND circuit 43.

The comparator 41 compares the front acceleration detection result (Gx1), which is the definite integration value, with the front threshold (ThFGx1). When the front acceleration detection result (Gx1) is greater than the front threshold (ThFGx1), the comparator 41 outputs a signal at the high level. The comparator 42 compares the rear acceleration detection result (Gx2), which is the definite integration value, with the rear threshold (ThFGx2). When the rear acceleration detection result (Gx2) is greater than the rear threshold (ThFGx2), the comparator 42 outputs a signal at the high level. When the AND circuit 43 inputs the signals at the high level from both the comparators 41 and 42, the AND circuit 43 outputs a front-collision-state activation signal showing occurrence of front collision of the vehicle. That is, the AND circuit 43 is configured to output a determination result whether the vehicle causes front collision.

Thus, the front-collision-detection logic portion 40 outputs the front-collision-state activation signal to the first occupant protection apparatus group 2 and the third occupant protection apparatus group 4.

The front-collision-detection logic portion 40 sets a front collision detection flag when determining that the vehicle causes front collision. The front-collision-detection logic portion 40 may output the front-collision-state activation signal to the rear-collision-detection logic portion 50 or may generate and output a signal other than the front-collision-state activation signal, instead of setting the front collision detection flag.

The rear-collision-detection logic portion 50 inputs the front acceleration detection result and the rear acceleration detection result from the definite integration portion 30 and determines existence of rear collision of the vehicle based on the detection results. The rear-collision-detection logic portion 50 has a first rear collision threshold (ThBGx1) and a second rear collision threshold (ThBGx2) for determining the rear collision. The first rear collision threshold (ThBGx1) corresponds to the front acceleration detection result, and the second rear collision threshold (ThBGx2) corresponds to the rear acceleration detection result.

Figure 3:
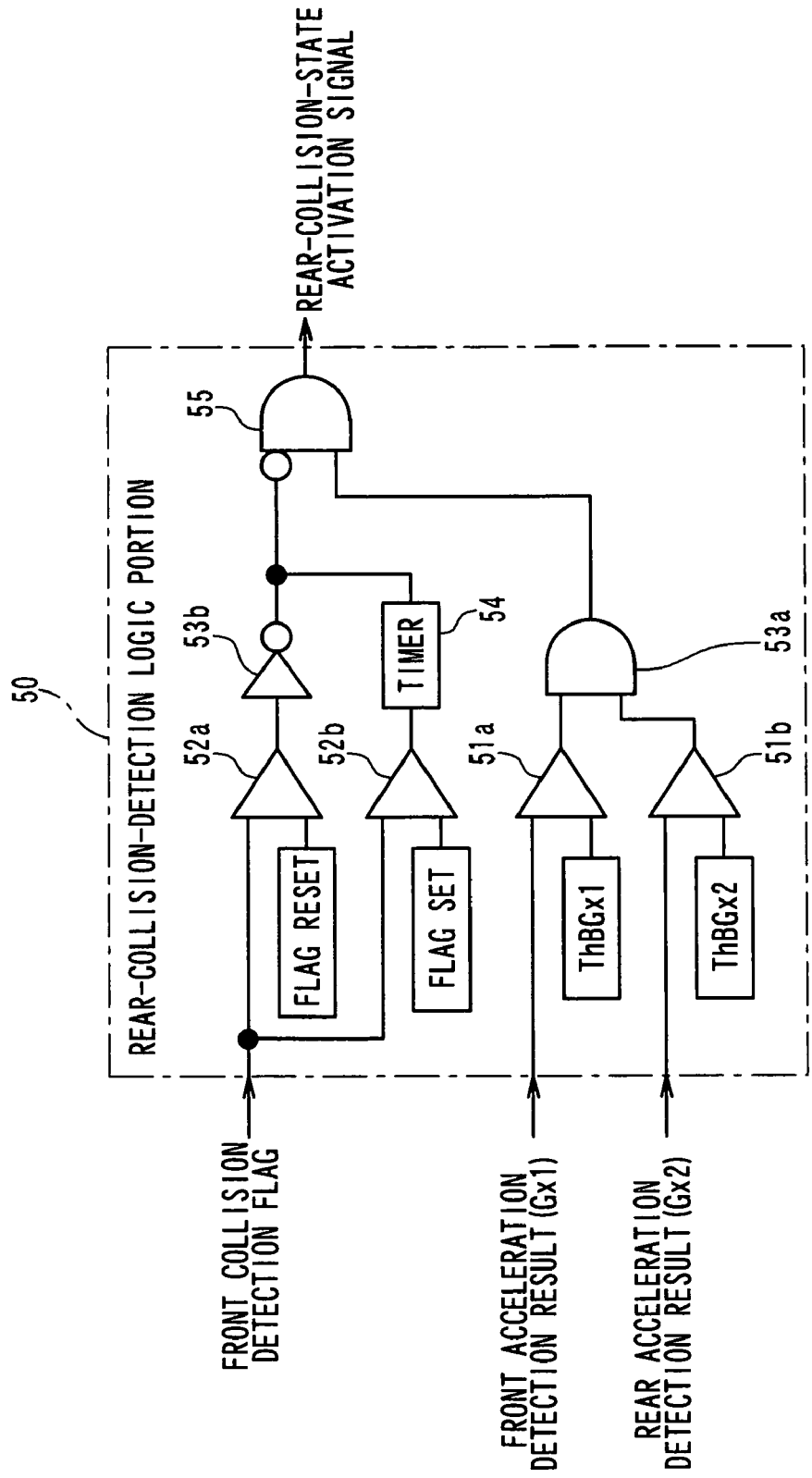
FIG. 3 is a diagram showing a rear-collision-detection logic portion.

FIG. 3 is a diagram showing the rear-collision-detection logic portion 50. The rear-collision-detection logic portion 50 includes four comparators 51a, 51b, 52a, 52b, an AND circuit 53a, a NOT circuit 53b, a timer 54, and an AND circuit 55.

The comparator 51a compares the front acceleration detection result (Gx1), which is the definite integration value, with the first rear collision threshold (ThBGx1). When the front acceleration detection result (Gx1) is greater than the first rear collision threshold (ThBGx1), the comparator 51a outputs a signal at the high level. The comparator 51b compares the rear acceleration detection result (Gx2), which is the definite integration value, with the second rear collision threshold (ThBGx2). When the rear acceleration detection result (Gx2) is greater than the second rear collision threshold (ThBGx2), the comparator 51b outputs a signal at the high level.

The comparator 52a is configured to output a signal at the high level when the front collision detection flag is not set. The comparator 52b is configured to output a signal at the high level when the front collision detection flag is set.

When the AND circuit 53a inputs the signals at the high level from both the comparators 51a and 51b, the AND circuit 53a outputs a rear-collision-state activation signal showing occurrence of rear collision of the vehicle. That is, the AND circuit 53a is configured to output a determination result whether the vehicle causes rear collision. The NOT circuit 53b inverts the signal outputted from the comparator 52a.

The timer 54 is configured to start counting for a predetermined period when the front-collision-detection logic portion 40 sets the front collision detection flag, and thereby the timer 54 inputs the signal at the high level from the comparator 52b. For example, the timer 54 outputs the signal at the low level while counting for the predetermined period and outputs the signal at the low level when a counted value becomes 0 in the counting.

The predetermined period is set to be shorter than a time period between front collision of the vehicle and rear collision, which is expected be caused subsequent to the front collision. By specifying the predetermined period in this manner, the protection apparatuses of the second occupant protection apparatus group 3 is kept non-activated in the time period after the front collision and a time point immediately before the rear collision. Thus, erroneous activation of the protection device is avoided. The predetermined period may be set to a fixed period and may be set to a variable period.

The AND circuit 55 inputs the rear-collision-state activation signal from the AND circuit 53a and the signal, which is outputted from the timer 54 and inverted. The AND circuit 55 further permits output of the rear-collision-state activation signal inputted from the AND circuit 53a when the counted value of timer 54 becomes 0. That is, the AND circuit 55 prohibits output of the rear-collision-state activation signal, while the timer 54 counts for the predetermined period.

When the front collision detection flag is not set, the comparator 52b does not output a signal at the high level to the timer 54 to start the timer 54. On the other hand, when the front collision detection flag is not set, the comparator 52a outputs the signal at the high level. Therefore, the signal at the high level is inverted through the NOT circuit 53b and outputted to the AND circuit 55 as an inverted signal at the high level. In this manner, the AND circuit 55 permits outputting of the rear-collision-state activation signal when inputting the rear-collision-state activation signal from the AND circuit 53a.

Thus, the structure of the activation device 1 has been described. The activation device 1 is configured as an ECU including a microcomputer and the like.

The first occupant protection apparatus group 2 includes multiple front-collision protection apparatuses for front collision so as to protect an occupant in the case of front collision. The front-collision protection apparatuses are, for example, air bags for a driver's seat and a passenger seat to be activated in response to input of the front-collision-state activation signal.

The second occupant protection apparatus group 3 includes multiple rear-collision protection apparatuses for rear collision so as to protect an occupant in the case of rear collision. The rear-collision protection apparatus is at least one of an active headrest and a rear window curtain airbag. The rear-collision protection apparatus is used for protecting occupant's neck and head when the rear side of the vehicle is collided from the behind. The rear-collision protection apparatus is activated in response to input of the rear-collision-state activation signal.

The third occupant protection apparatus group 4 includes multiple dual-purpose protection apparatuses related to be activated in the case of front collision or rear collision for protecting an occupant. The dual-purpose protection apparatuses are, for example, pre-tensioners provided in respective seats to be activated in response to input of at least one of the front-collision-state activation signal and the rear-collision-state activation signal.

Therefore, in the present embodiment, both the front-collision protection apparatus and the dual-purpose protection apparatus function as protection apparatuses related to front collision, and both the rear-collision protection apparatus and the dual-purpose protection apparatus function as protection apparatuses related to rear collision.

Figure 4:
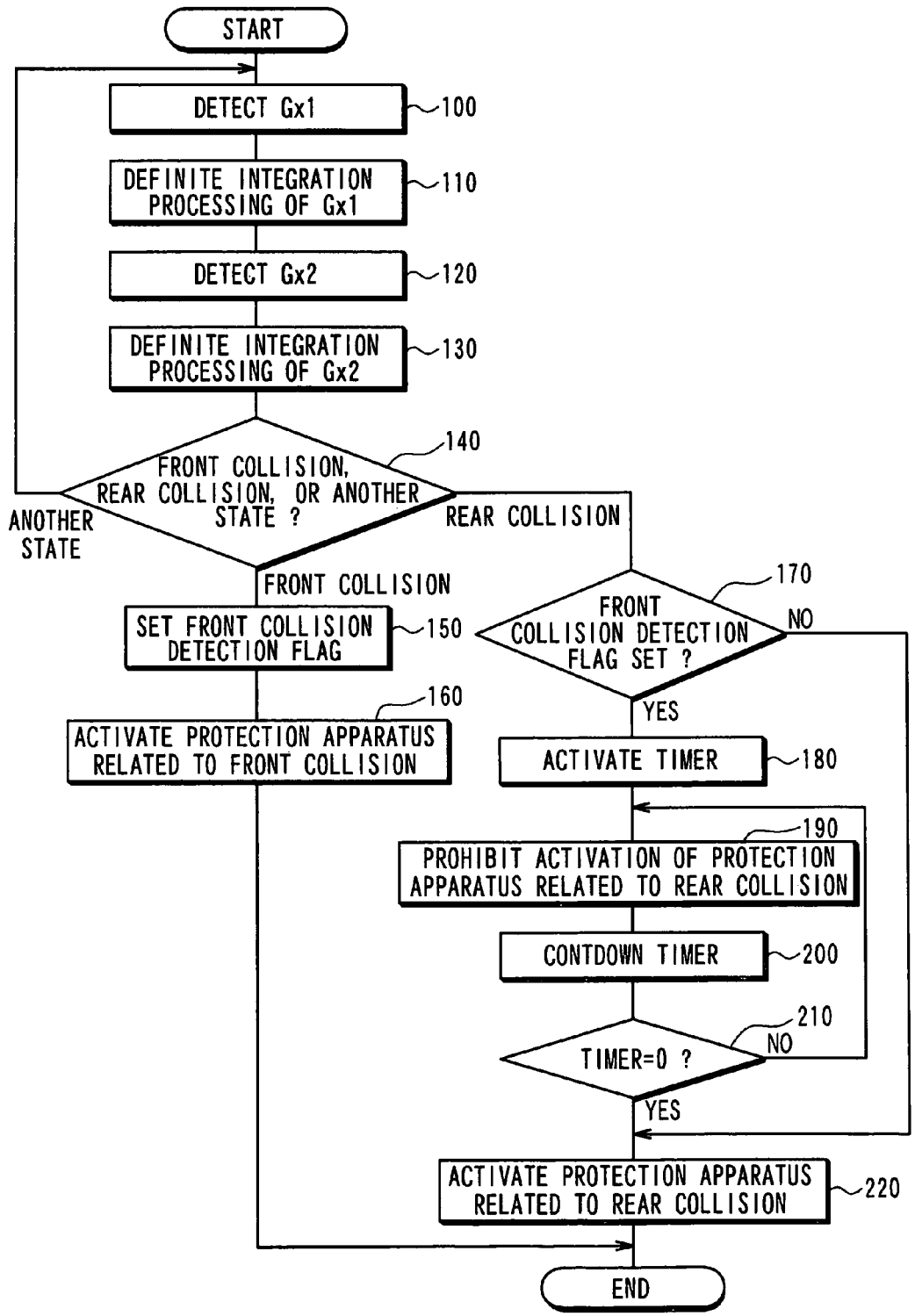
FIG. 4 is a flowchart showing an operation of the activation device shown in FIG. 1.

Subsequently, an operation of the activation device 1 to activate each protection apparatus of the occupant protection apparatus groups 2 to 4 will be described with reference to the flow chart shown in FIG. 4. The processings shown in FIG. 4 are started when electric power is supplied to the activation device 1.

First, at step 100, the front acceleration (Gx1) of the vehicle is detected. At step 110, the definite integration processing of the front detection signal is performed, and the front acceleration detection result is obtained.

At step 120, the rear acceleration (Gx2) of the vehicle is detected. At step 130, the definite integration processing of the rear detection signal is performed, and the rear acceleration detection result is obtained.

At step 140, it is determined whether the vehicle causes front collision, the vehicle causes rear collision, or the vehicle is in another state. The present determination at step 140 is made by determining whether the front acceleration detection result (Gx1) obtained at step 110 is greater than the first front collision threshold (ThFGx1) and determining whether the rear acceleration detection result (Gx2) obtained at step 130 is greater than the second front collision threshold (ThFGx2).

For example, it is determined that the vehicle causes front collision when the front acceleration detection result (Gx1) obtained at step 110 is determined to be greater than the first front collision threshold (ThFGx1) and when the rear acceleration detection result (Gx2) obtained at step 130 is determined to be greater than the second front collision threshold (ThFGx2). When it is determined that the vehicle causes front collision, the processing proceeds to step 150.

Alternatively, it is determined that the vehicle causes rear collision when the front acceleration detection result (Gx1) is determined to be less than the first rear collision threshold (ThBGx1) and when the rear acceleration detection result (Gx2) is determined to be less than the second rear collision threshold (ThBGx2). When it is determined that the vehicle causes rear collision, the processing proceeds to step 170.

When it is determined that the vehicle is in another state, that is, when it is determined that the vehicle does not cause front collision or rear collision, the processing returns to step 100. In this case, step 100 to step 130 are again executed. Thus, the front acceleration detection result (Gx1) and the rear acceleration detection result (Gx2) are again obtained, and it is determined whether the vehicle causes front collision or rear collision at step 140.

When it is determined that the vehicle causes front collision at step 140, the front collision detection flag is set at step 150.

Thereby, at step 160, the protection apparatuses related to front collision are activated. In this way, the protection apparatuses related to front collision are activated to protect an occupant from front collision. Thus, an operation for protection from front collision is completed, and the processing is once terminated and returned to step 100.

When it is determined that the vehicle causes rear collision at step 140, the processing proceeds to step 170 at which it is determined whether the front collision detection flag is presently set. When the front collision detection flag is determined to be presently set at step 170, the processing proceeds to step 180.

At step 180, the predetermined period is set to the timer 54, and the timer 54 is activated. As described above, the predetermined period is set to the timer 54, and a count down sequence of the predetermined period is performed through the subsequent steps.

At step 190, activation of the protection apparatuses related to rear collision is prohibited. Specifically, output of the rear-collision-state activation signal to the rear-collision protection apparatuses of the second occupant protection apparatus group 3 and the dual-purpose protection apparatuses of the third occupant protection apparatus group 4 is prohibited. Thereby, the protection apparatuses related to rear collision are not activated.

At step 200, the timer 54 is activated, and the count down sequence of the predetermined period is performed.

At step 210, it is determined whether the value of the predetermined period set to the timer 54 becomes 0 through the countdown sequence. When it is determined that the value of the predetermined period is not 0 at step 210, the processing returns to step 190. Thus, activation of the protection apparatuses related to rear collision is continually prohibited, and the countdown sequence of the timer 54 is continued. Processings of step 190 to step 210 are repeated until the value of the predetermined period becomes 0 through the countdown sequence of the timer 54.

When the value of the predetermined period of the timer 54 is determined to be 0 at step 210, the processing proceeds to step 220.

At step 220, the protection apparatuses related to rear collision are activated. Specifically, the rear-collision-state activation signal is outputted to the rear-collision protection apparatuses of the second occupant protection apparatus group 3 and the dual-purpose protection apparatuses of the third occupant protection apparatus group 4. Thus, the protection apparatuses are activated to protect an occupant from rear collision. In this manner, an operation for protection from rear collision is completed, and the processing is once terminated and returned to step 100.

When the front collision detection flag is determined to be not set at step 170, the vehicle causes rear collision from the behind in the state where the vehicle does not cause front collision. In this case, the processing proceeds to step 220, at which the protection apparatuses related to rear collision is activated to protect an occupant from rear collision. Thus, the processing is once terminated and returned to step 100.

As described above, in the present embodiment, when front collision of the vehicle is detected, the front collision detection flag is set. In addition, the rear-collision-detection logic portion 50 is prohibited from outputting the rear-collision-state activation signal for the predetermined period from the time point at which the front collision detection flag is set.

According to the present structure, the timer 54 and the AND circuit 55 of the rear-collision-detection logic portion 50 do not output the rear-collision-state activation signal for the predetermined period after activation of the front-collision protection apparatuses and the dual-purpose protection apparatuses in response to front collision of the vehicle. Therefore, the protection apparatuses related to rear collision are not activated in response to front collision. Therefore, erroneous activation of the protection apparatuses related to rear, collision in response to front collision of the vehicle can be avoided. For example, in chain collision, the vehicle first causes front collision, and the vehicle subsequently causes rear collision. In such a state, the activation device 1 according to the present embodiment is capable of activating the protection apparatuses related to front collision in response to front collision and steadily activating the protection apparatuses related to rear collision in response to rear collision subsequent to the front collision.

According to the present embodiment, the first acceleration sensor 10, the second acceleration sensor 20, and the definite integration portion 30 are one example of a collision detection unit. The front-collision-detection logic portion 40 is one example of a front collision detection unit, and the rear-collision-detection logic portion 50 is one example of a rear collision detection unit. The predetermined period is one example of a first predetermined period.

Second Embodiment

As follows, subjects different from those in the second embodiment will be described. In the present embodiment, the occupant protection apparatus is configured to detect rear collision further easily compared with the first embodiment, since it is highly possible that the vehicle causes rear collision subsequent to front collision in a multiple collision such as chain collision.

The front-collision-detection logic portion 40 has a first front collision threshold (ThFGx1H) and a second front collision threshold (ThFGx2H). The front-collision-detection logic portion 40 determines whether the vehicle causes front collision based on the thresholds (ThFGx1H), (ThFGx2H). The first front collision threshold (ThFGx1H) corresponds to the front acceleration detection result, and the second front collision threshold (ThFGx2H) corresponds to the rear acceleration detection result.

The rear-collision-detection logic portion 50 has a first rear collision threshold (ThFGx1H) and a second rear collision threshold (ThFGx2H). The rear-collision-detection logic portion 50 further has a third rear collision threshold (ThBGx1L), which is less than a first rear collision threshold (ThBGx1H), and a fourth rear collision threshold (ThBGx2L), which is less than a second rear collision threshold (ThBGx2H). The first rear collision threshold (ThBGx1H) and the third rear collision threshold (ThBGx1L) correspond to the front acceleration detection result, and the second rear collision threshold (ThBGx2H) and the fourth rear collision threshold (ThBGx2L) correspond to the rear acceleration detection result.

In the present embodiment, the first rear collision threshold (ThBGx1H) is changed to the third rear collision threshold (ThBGx1L), which is less than the first rear collision threshold (ThBGx1H). In this way, the front acceleration detection result easily exceed the third rear collision threshold (ThBGx1L) compared with the first rear collision threshold (ThBGx1H). That is, the rear-collision-detection logic portion 50 changes the threshold so as to enhance sensitivity of detection of rear collision. The relationship between the second rear collision threshold and the fourth rear collision threshold is similar to the relationship between the first rear collision threshold and the third rear collision threshold.

Figure 5:
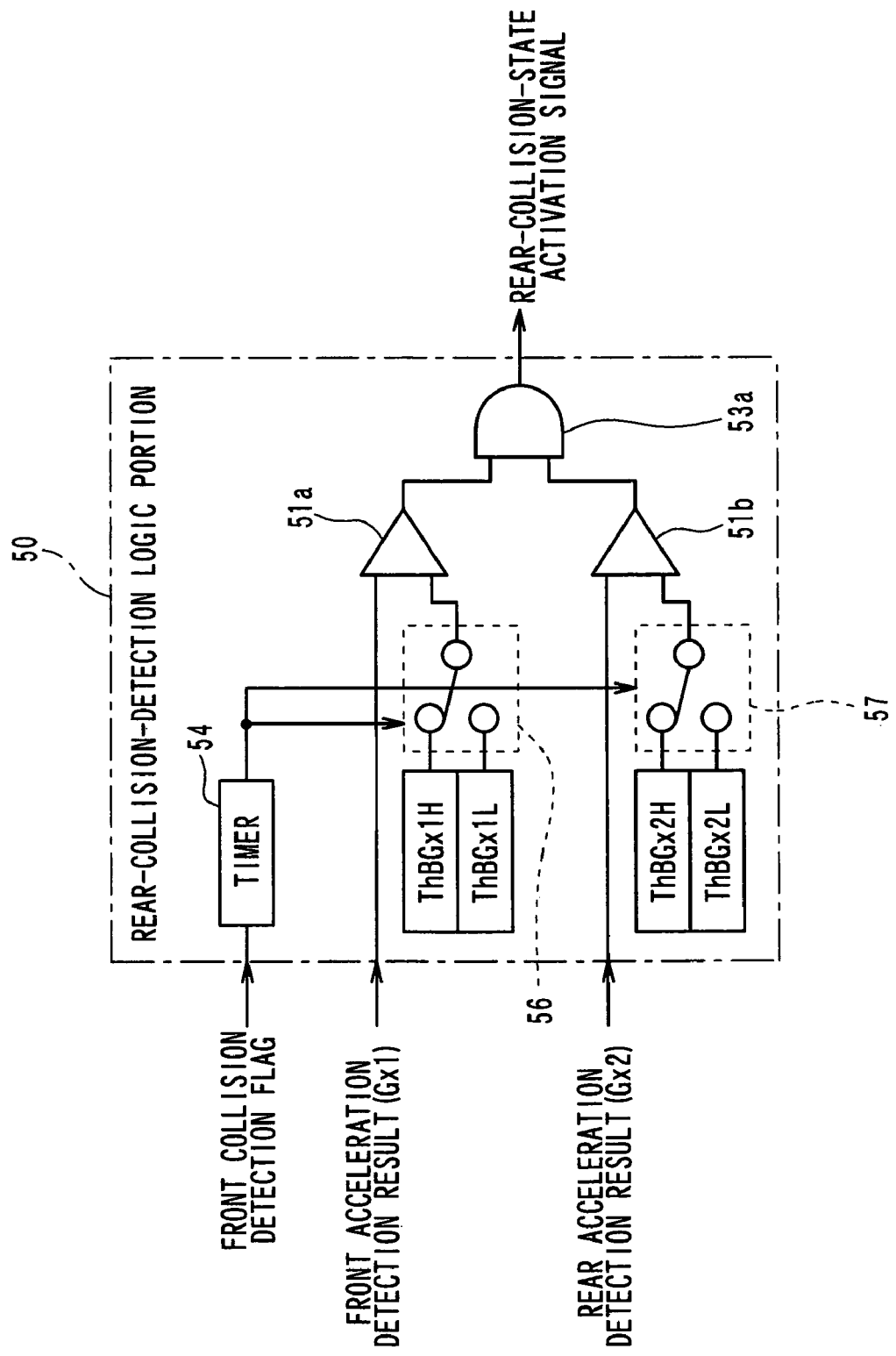
FIG. 5 is a diagram showing a rear-collision-detection logic portion according to a second embodiment.

FIG. 5 is a diagram showing the rear-collision-detection logic portion 50 according to the present embodiment. As shown in FIG. 5, the rear-collision-detection logic portion 50 includes the comparators 51*a* and 51*b*, the AND circuit 53*a*, the timer 54, and switch portions 56 and 57.

The switch portion (first switch portion) 56 is connected to one of input terminals of the comparator 51*a*. The switch portion 56 is switched by the timer 54 to output one of the first rear collision threshold (ThBGx1H) and the third rear collision threshold (ThBGx1L) selectively to the comparator 51*a*. The switch portion (second switch portion) 57 is connected to one of input terminals of the comparator 51*b*. The switch portion 57 is switched by the timer 54 to output one of the second rear collision threshold (ThBGx2H) and the fourth rear collision threshold (ThBGx2L) selectively to the comparator 51*b*. Each of the switch portions 56 and 57 is, for example, a switching element such as a transistor.

The comparator 51*a* is configured to compare the front acceleration detection result, which is the definite integration value, with the threshold inputted via the switch portion 56 and output the comparison result to the AND circuit 53*a*. Specifically, the comparator 51*a* outputs a signal at the high level when the detection result is greater than the threshold.

The comparator 51*b* is configured to compare the rear acceleration detection result, which is the definite integration value, with the threshold inputted via the switch portion 57 and output the comparison result to the AND circuit 53*a*. Specifically, the comparator 51*b* outputs a signal at the high level when the detection result is greater than the threshold.

When the front-collision-detection logic portion 40 sets the front collision detection flag, the timer 54 starts a countdown sequence for a predetermined period. Further, the timer 54 switches each of the switch portions 56 and 57 during the countdown sequence. More specifically, in the predetermined period, the timer 54 switches the first rear collision threshold (ThBGx1H) to the third rear collision threshold (ThBGx1L), which is less than the first rear collision threshold (ThBGx1H), and switches the second rear collision threshold (ThBGx2H) to the fourth rear collision threshold (ThBGx2L), which is less than the second rear collision threshold (ThBGx2H). In this way, when the front-collision-detection logic portion 40 detects front collision, the rear-collision-detection logic portion 50 changes the first rear collision threshold (ThBGx1H) to the third rear collision threshold (ThBGx1L) and changes the second rear collision threshold (ThBGx2H) to the fourth rear collision threshold (ThBGx2L). Thus, the thresholds are changed such that the detection results further easily exceed the changed thresholds. In this state, rear collision of the vehicle is detected.

In the present embodiment, the predetermined period is also set to be shorter than a time period between front collision of the vehicle and rear collision, which is expected be caused subsequent to the front collision. By setting the predetermined period in this way, the threshold for determining rear collision is set to be small in the predetermined period from front collision immediately before rear collision of the vehicle. Thus, rear collision is easily detected in the predetermined period. In this embodiment, the predetermined period may be also set to a fixed period and may be set to a variable period.

Subsequently, an operation of the activation device 1 to activate each protection apparatus of the occupant protection apparatus groups 2 to 4 according to the present embodiment will be described with reference to the flow chart shown in FIG. 6. The processings shown in FIG. 6 are started when electric power is supplied to the activation device 1.

First, at step 300 to step 330, processings similar to step 100 to step 130 are executed.

At step 340, similarly to step 140, it is determined whether the vehicle causes front collision, the vehicle causes rear collision, or the vehicle is in another state. At present step 340, the front-collision-detection logic portion 40 determines whether the vehicle causes front collision using the first front collision threshold (ThFGx1H) and the third front collision threshold (ThFGx2H). When it is determined that the vehicle causes front collision, the processing proceeds to step 350.

In this condition, the front collision detection flag is not set by the front-collision-detection logic portion 40. Therefore, the timer 54 switches the switch portions 56 and 57 such that the comparator 51*a* inputs the first rear collision threshold (ThBGx1H), and the comparator 51*b* inputs the second rear collision threshold (ThBGx2H). At present step 340, the rear-collision-detection logic portion 50 determines whether the vehicle causes rear collision using the first rear collision threshold (ThBGx1H) and the second rear collision threshold (ThBGx2H). When it is determined that the vehicle causes rear collision, the processing proceeds to step 370.

At step 340, when it is determined that the vehicle is in another state, that is, when it is determined that the vehicle does not cause front collision or rear collision, the processing returns to step 300, similarly to step 140. In this case, step 300 to step 330 are again executed. Thus, the front acceleration detection result (Gx1) and the rear acceleration detection result (Gx2) are again obtained, and it is determined whether the vehicle causes front collision or rear collision at step 340.

When it is determined that the vehicle causes front collision at step 340, the front collision detection flag is set at step 350, similarly to step 150.

At step 360, the front-collision protection apparatus is activated, similarly to step 160. Thus, an operation for protection from front collision is completed, and the processing is once terminated and returned to step 300.

When it is determined that the vehicle causes rear collision at step 340, the processing proceeds to step 370 at which it is determined whether the front collision detection flag is presently set, similarly to claim 170. When the front collision detection flag is determined to be presently set at step 370, the processing proceeds to step 380.

At step 380, the predetermined period is set to the timer 54, and the timer 54 is activated, similarly to step 180.

At step 390, the rear collision threshold H, which is presently set to the rear-collision-detection logic portion 50, is changed to the rear collision threshold L, which is less than the rear collision threshold H. Specifically, the first rear collision threshold (ThBGx1H) is changed to the third rear collision threshold (ThBGx1L). In addition, the second rear collision threshold (ThBGx2H) is changed to the fourth rear collision threshold (ThBGx2L). In this way, each of the detection results easily exceeds the corresponding threshold compared with the determination for rear collision using the first rear collision threshold (ThBGx1H) and the second rear collision threshold (ThBGx2H). Thus, determination of rear collision can be performed with more sensitivity.

At step 400, the timer 54 is activated, and the count down sequence of the predetermined period is performed, similarly to step 200.

At step 410, it is determined whether the vehicle causes rear collision using the third rear collision threshold (ThBGx1L) and the fourth rear collision threshold (ThBGx2L). At step 410, when it is determined that the vehicle causes rear collision, the processing proceeds to step 420.

At step 420, the protection apparatuses related to rear collision are activated, similarly to step 220. In this manner, an operation for protection from rear collision is completed, and the processing is once terminated and returned to step 300.

When it is determined that the vehicle does not cause rear collision at step 410, the processing proceeds to step 430. At step 430, similarly to step 210, it is determined whether the value of the predetermined period set to the timer 54 becomes 0 through the countdown sequence. When it is determined that the value of the predetermined period of the timer 54 is not 0 at step 430, the processing returns to step 390. Subsequently, the thresholds for determining rear collision is set to the third rear collision threshold (ThBGx1L) and the fourth rear collision threshold (ThBGx2L), and the timer 54 performs the countdown sequence for the predetermined period. Processings of step 390 to step 410 and step 430 are repeated until the value of the predetermined period, which is set to the timer 54, becomes 0 through the countdown sequence of the timer 54.

When the value of the predetermined period is determined to be 0 at step 430, it is determined that the vehicle causes front collision and the vehicle does not cause rear collision from the behind. Thus, the processing is once terminated and returned to step 300.

When it is determined that the front collision detection flag is not set at step 370, the processing proceeds to step 420, at which the protection apparatuses related to rear collision are activated, similarly to step 170. Thus, the processing is once terminated and returned to step 300.

As described above, in the present embodiment, the front collision detection flag is set when it is determined that the vehicle causes front collision. In response to that, the thresholds for determining rear collision are changed, and it is determined whether rear collision is caused in the predetermined period, in which rear collision is expected to occur after occurrence of front collision.

In this way, each of the detection results easily exceeds the corresponding one of the third rear collision threshold (ThBGx1L) and the fourth rear collision threshold (ThBGx2L), compared with the corresponding one of the first rear collision threshold (ThBGx1H) and the second rear collision threshold (ThBGx2H). Therefore, sensitivity of detection of rear collision is further enhanced. Thus, the rear-collision protection apparatus and the dual-purpose protection apparatus can be steadily activated when the vehicle causes rear collision in multiple collision.

Other Embodiment

According to the first embodiment, the first front collision threshold and the second front collision threshold are used in order to determine front collision of the vehicle. The first embodiment exemplifies a substantially minimum determination method of a front collision determination. That is, front collision may be determined using an additional threshold. Similarly, in addition to the first rear collision threshold and the second rear collision threshold, an additional threshold may be used for determining rear collision of the vehicle.

The configuration of the occupant protection apparatuses of the first to third occupant protection apparatus groups 2 to 4 is one example, and another apparatus may be added to the configuration.

According to the first embodiment, the rear-collision-detection logic portion 50 is prohibited from outputting the rear-collision-state activation signal for the predetermined period after detection of front collision. The predetermined period may be specified by a first predetermined period. In addition, the method for detecting rear collision may be modified such that rear collision of the vehicle is further easily detected in a second predetermined period subsequent to the first predetermined period. In this way, rear collision of the vehicle can be detected with enhanced sensitivity in the second predetermined period, in which rear collision possibly occurs to the vehicle by being collided by another vehicle from the behind subsequent to front collision in, for example, multiple collision.

In this case, the rear-collision-detection logic portion 50 described in the second embodiment is effectively applicable. In the rear-collision-detection logic portion 50, the first rear collision threshold (ThBGx1H) and the second rear collision threshold (ThBGx2H) are respectively changed to the third rear collision threshold (ThBGx1L) and the fourth rear collision threshold (ThBGx2L). Therefore, each of the detection results easily exceeds the corresponding one of the third rear collision threshold (ThBGx1L) and the fourth rear collision threshold (ThBGx2L). Therefore, rear collision of the vehicle can be further easily detected in the second predetermined period. The second predetermined period may be set to a fixed period and may be set to a variable period.

According to the present structure, the rear-collision protection apparatus is kept non-active for the first predetermined period after the vehicle causes front collision. In addition, rear collision is detected with enhanced sensitivity in the second predetermined period, in which rear collision is considered to be easily caused, after elapse of the first predetermined period. Thus, the rear-collision protection apparatus can be steadily activated effectively with respect to rear collision.

In the embodiments, the front-collision-state activation signal is outputted to the first and third occupant protection apparatus groups 2 and 4 at the time of front collision. In addition, the rear-collision-state activation signal is outputted to the second and third occupant protection apparatus groups 3 and 4 at the time of rear collision. It is noted that such activation signals are not limited be outputted in this manner. For example, the front-collision-state activation signal may be outputted only to the first occupant protection apparatus group 2 at the time of front collision. In addition, the rear-collision-state activation signal may be outputted only to the second occupant protection apparatus group 3 at the time of rear collision.

In the embodiments, the activation device 1 includes two acceleration sensors 10 and 20 for detecting acceleration in both the first detection direction and the second detection direction. The activation device 1 may include three or more acceleration sensors. In this case, detection of front collision and/or rear collision may be performed using a part of detection results of the multiple acceleration sensors. One element of an acceleration sensor, which is capable of detecting both the first detection direction and the second detection, may be used. In this case, one acceleration sensor suffices.

Front collision and/or rear collision of the vehicle need not be detected using multiple the detection results such as the front acceleration detection result and the rear acceleration detection result. Front collision and/or rear collision of the vehicle may be detected using one detection result. In this case, a detection result obtained by one acceleration sensor may be used, and one of multiple detection results obtained by multiple acceleration sensors may be used.

The steps shown in each drawing corresponds to a unit of a corresponding function. Each step in the flow charts of FIG. 4 or FIG. 6 may be produced as a hardware device.

Summarizing the above embodiments, an activation device for protection apparatus for an occupant, the activation device includes:

a front collision detection unit (40) configured to output a front-collision-state activation signal to a front-collision protection apparatus; which relates to front collision, so as to activate the front-collision protection apparatus when detecting front collision of a vehicle; and a rear collision detection unit (50) configured to output a rear-collision-state activation signal to a rear-collision protection apparatus, which relates to rear collision, so as to activate the rear-collision protection apparatus when detecting rear collision of the vehicle.

The rear collision detection unit (50) is configured to prohibit output of the rear-collision-state activation signal to the rear-collision protection apparatus for a predetermined period when the front collision detection unit (40) detects front collision of the vehicle.

In the present structure, the rear-collision-state activation signal is not outputted from the rear collision detection unit (50) for the predetermined period, after the front-collision protection apparatus is activated in response to front collision of the vehicle. Therefore, activation of the rear-collision protection apparatus can be restricted in response to front collision of the vehicle. Thus, erroneous activation of the rear-collision protection apparatus in response to front collision of the vehicle can be avoided.

According to the embodiment, the activation device may further includes a collision detection unit (10, 20, 30) configured to obtain acceleration in a front direction of the vehicle as a front acceleration detection result and obtain acceleration in a rear direction of the vehicle as a rear acceleration detection result.

The front collision detection unit (40) may be configured to input the front acceleration detection result and the rear acceleration detection result, determine whether the front acceleration detection result is greater than a first front collision threshold, and determine whether the rear acceleration detection result is greater than a second front collision threshold, so as to determine whether the vehicle causes front collision.

The rear collision detection unit (50) may be configured to input the front acceleration detection result and the rear acceleration detection result, determine whether the front acceleration detection result is greater than a first rear collision threshold, and determine whether the rear acceleration detection result is greater than a second rear collision threshold, so as to determine whether the vehicle causes rear collision.

In this manner, front collision and rear collision of the vehicle can be determined by comparing each of the acceleration detection results with corresponding one of the thresholds.

According to the embodiment, the rear collision detection unit (50) may be configured to ease detection of rear collision of the vehicle in a second predetermined period subsequent to elapse of a first predetermined period.

In this way, rear collision of the vehicle can be detected with enhanced sensitivity in a condition where rear collision possibly occurs to the vehicle by being collided by another vehicle from the behind subsequent to front collision of the vehicle in, for example, multiple collision. Therefore, the rear-collision protection apparatus is kept non-active for the first predetermined period after the vehicle causes front collision. In addition, rear collision is detected with enhanced sensitivity in the second predetermined period, in which rear collision is considered to be easily caused from behind, after elapse of the first predetermined period. Thus, the rear-collision protection apparatus can be steadily activated effectively to rear collision.

According to the embodiment, the rear collision detection unit (50) may be configured to change the first rear collision threshold and the second rear collision threshold such that each of the acceleration detection results easily exceeds corresponding one of the thresholds and determine rear collision of the vehicle.

In this way, each of the thresholds for detecting rear collision is changed such that each of the detection results becomes to further easily exceed the threshold. Therefore, detection of rear collision of the vehicle can be eased.

According to the embodiment, an activation device for an occupant protection apparatus, the activation device includes:

a front collision detection unit (40) configured to output a front-collision-state activation signal to a front-collision protection apparatus, which relates to front collision, so as to activate the front-collision protection apparatus when detecting front collision of a vehicle; and a rear collision detection unit (50) configured to output a rear-collision-state activation signal to a rear-collision protection apparatus, which relates to rear collision, so as to activate the rear-collision protection apparatus when detecting rear collision of the vehicle.

The rear collision detection unit (50) is configured to ease detection of rear collision of the vehicle for a predetermined period when the front collision detection unit (40) detects front collision of the vehicle.

In this way, detection of rear collision is eased in the predetermined period after front collision of the vehicle. Therefore, rear collision of the vehicle can be detected with enhanced sensitivity. In this way, the rear-collision protection apparatus can be steadily activated effectively to rear collision subsequent to front collision in, for example, multiple collision.

According to the embodiment, the activation device may further include a collision detection unit (10, 20, 30) configured to obtain acceleration in a front direction of the vehicle as a front acceleration detection result and obtain acceleration in a rear direction of the vehicle as a rear acceleration detection result.

The front collision detection unit (40) may be configured to input the front acceleration detection result and the rear acceleration detection result, determine whether the front acceleration detection result is greater than a first front collision threshold, and determine whether the rear acceleration detection result is greater than a second front collision threshold, so as to determine whether the vehicle causes front collision.

The rear collision detection unit (50) may be configured to input the front acceleration detection result and the rear acceleration detection result, determine whether the front acceleration detection result is greater than a first rear collision threshold, and determine whether the rear acceleration detection result is greater than a second rear collision threshold, so as to determine whether the vehicle causes rear collision.

The rear collision detection unit (50) may be configured to change the first rear collision threshold and the second rear collision threshold such that each of the acceleration detection results easily exceeds corresponding one of the thresholds when the front collision detection unit (40) detects front collision of the vehicle and determine rear collision of the vehicle.

In this way, each of the thresholds for detecting rear collision is changed after front collision of the vehicle. Therefore, each of the detection results becomes to further easily exceed the threshold. Thus, rear collision of the vehicle can be detected with enhanced sensitivity.

According to the embodiment, the rear-collision protection apparatus may be at least one of an active headrest and a rear window curtain airbag.

The above structures of the embodiments can be combined as appropriate.

The above processings such as comparisons and determinations are not limited being executed by the front-collision-detection logic portion 40 and the ear-collision-detection logic portion 50. The logic portion may have various structures including the front-collision-detection logic portion 40 and the ear-collision-detection logic portion 50 shown as an example.

The above processings such as comparisons and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

The above embodiments are not limited to an analog circuitry including analog signal handling equipments configured to perform the processings such as the comparison and other operations by using analog quantities. For example, at least part of the signals in the circuit structures in the above embodiments may be converted to digital signals, and substantially the same processings such as the comparison and other operations may be performed using the converted digital signals by employing a microcomputer, a programmable logic circuit, and the like.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An activation device for detecting a collision of a vehicle and activating a protection apparatus for protecting an occupant, the activation device comprising:
   a front collision detection unit configured to
      detect a front collision of the vehicle and
      output a front-collision-state activation signal to a protection apparatus related to the front collision so as to activate the protection apparatus related to the front collision when detecting the front collision; and
   a rear collision detection unit configured to
      detect a rear collision of the vehicle,
      output a rear-collision-state activation signal to a protection apparatus related to the rear collision so as to activate the protection apparatus related to the rear collision when detecting the rear collision,
      prohibit output of the rear-collision-state activation signal to the protection apparatus related to rear collision for a first predetermined period when the front collision detection unit detects the front collision, and
      set a first rear collision threshold and a second rear collision threshold, which are for determining whether the vehicle causes the rear collision, respectively to a third rear collision threshold and a fourth rear collision threshold, which are less than the first rear collision threshold and the second rear collision threshold respectively, in a second predetermined period subsequent to elapse of the first predetermined period; wherein
   the first and second predetermined periods are shorter than a time period between the front collision and an expected subsequent rear collision.

2. The activation device according to claim 1, further comprising:
   a collision detection unit configured to
      obtain acceleration in a front direction of the vehicle as a front acceleration detection result and
      obtain acceleration in a rear direction of the vehicle as a rear acceleration detection result,
   wherein the front collision detection unit is further configured to
      receive the front acceleration detection result from the collision detection unit and the rear acceleration detection result, and
      determine whether the front acceleration detection result is greater than a first front collision threshold and determine whether the rear acceleration detection result is greater than a second front collision threshold so as to determine whether the vehicle causes the front collision,
wherein the rear collision detection unit is further configured to
receive the front acceleration detection result from the collision detection unit and the rear acceleration detection result, and
determine whether the front acceleration detection result is greater than the first rear collision threshold and determine whether the rear acceleration detection result is greater than the second rear collision threshold so as to determine whether the vehicle causes the rear collision.

3. The activation device according to claim 1, wherein the rear collision detection unit is further configured to ease detection of rear collision of the vehicle in the second predetermined period subsequent to elapse of the first predetermined period.

4. The activation device according to claim 3,
wherein the rear collision detection unit is further configured to
change the first rear collision threshold and the second rear collision threshold, such that
the front acceleration detection result easily exceeds the first rear collision threshold, and
the rear acceleration detection result easily exceeds the second rear collision threshold.

5. The activation device according to claim 1, wherein the protection apparatus related to the rear collision is at least one of an active headrest and a rear window curtain airbag.

6. The activation device according to claim 1, wherein the rear collision detection unit is further configured to set the first predetermined period to be shorter than a time period between the front collision and the rear collision, which is expected to be caused subsequent to the front collision.

7. An activation device for detecting collision of a vehicle and activating a protection apparatus for protecting an occupant, the activation device comprising:
a front collision detection unit configured to
detect a front collision of the vehicle and
output a front-collision-state activation signal to a protection apparatus related to the front collision so as to activate the protection apparatus related to the front collision when detecting the front collision;
a rear collision detection unit configured to
detect a rear collision of the vehicle,
output a rear-collision-state activation signal to a protection apparatus related to the rear collision so as to activate the protection apparatus related to the rear collision when detecting the rear collision, and
ease detection of the rear collision for a predetermined period when the front collision detection unit detects front collision;
a collision detection unit configured to
obtain acceleration in a front direction of the vehicle as a front acceleration detection result and
obtain acceleration in a rear direction of the vehicle as a rear acceleration detection result,
wherein the front collision detection unit is further configured to
receive the front acceleration detection result from the collision detection unit and the rear acceleration detection result,
determine whether the front acceleration detection result is greater than a first front collision threshold and determine whether the rear acceleration detection result is greater than a second front collision threshold so as to determine whether the vehicle causes the front collision,
wherein the rear collision detection unit is further configured to
receive the front acceleration detection result from the collision detection unit and the rear acceleration detection result,
determine whether the front acceleration detection result is greater than a first rear collision threshold and determine whether the rear acceleration detection result is greater than a second rear collision threshold so as to determine whether the vehicle causes the rear collision,
wherein the rear collision detection unit is further configured to
change the first rear collision threshold and the second rear collision threshold, when the front collision detection unit detects the front collision, such that
the front acceleration detection result easily exceeds the first rear collision threshold, and
the rear acceleration detection result easily exceeds the second rear collision threshold; wherein
the predetermined period is shorter than a time period between the front collision and an expected subsequent rear collision.

8. The activation device according to claim 7, wherein the protection apparatus related to the rear collision is at least one of an active headrest and a rear window curtain airbag.

9. The activation device according to claim 7, wherein the rear collision detection unit is further configured to
set, when the front collision detection unit detects the front collision, a first predetermined period to be shorter than a time period between the front collision and the rear collision, which is expected to be caused subsequent to the front collision; and
change the first rear collision threshold and the second rear collision threshold in the first predetermined period.

10. A method for activating a protection apparatus for protecting an occupant, the method comprising:
detecting a front collision of the vehicle;
detecting a rear collision of the vehicle;
outputting a front-collision-state activation signal to a protection apparatus related to the front collision so as to activate the protection apparatus related to the front collision when detecting the front collision;
outputting a rear-collision-state activation signal to a protection apparatus related to the rear collision so as to activate the protection apparatus related to the rear collision when detecting the rear collision and when the outputting is not prohibited;
prohibiting the outputting of the rear-collision-state activation signal for a first predetermined period when detecting the front collision; and
setting a first rear collision threshold and a second rear collision threshold, which are for determining whether the vehicle causes the rear collision, respectively to a third rear collision threshold and a fourth rear collision threshold, which are less than the first rear collision threshold and the second rear collision threshold, respectively, in a second predetermined period subsequent to elapse of the first predetermined period; wherein
the first and second predetermined periods are shorter than a time period between the front collision and an expected subsequent rear collision.

11. The method according to claim 10, further comprising:
setting the first predetermined period to be shorter than a time period between the front collision and the rear collision, which is expected to be caused subsequent to the front collision.

12. A method for activating a protection apparatus for protecting an occupant, the method comprising:
detecting a front collision of the vehicle;
detecting a rear collision of the vehicle;
outputting a front-collision-state activation signal to a protection apparatus related to the front collision so as to activate the protection apparatus related to the front collision when detecting the front collision;
outputting a rear-collision-state activation signal to a protection apparatus related to the rear collision so as to activate the protection apparatus related to the rear collision when detecting the rear collision;
easing detection of the rear collision of the vehicle for a predetermined period when detecting the front collision
obtaining acceleration in a front direction of the vehicle as a front acceleration detection result;
obtaining acceleration in a rear direction of the vehicle as a rear acceleration detection result;
receiving the front acceleration detection result and the rear acceleration detection result;
determining whether the front acceleration detection result is greater than a first front collision threshold and determining whether the rear acceleration detection result is greater than a second front collision threshold so as to determine whether the vehicle causes the front collision;
determining whether the front acceleration detection result is greater than a first rear collision threshold and determining whether the rear acceleration detection result is greater than a second rear collision threshold so as to determine whether the vehicle causes the rear collision;
changing the first rear collision threshold and the second rear collision threshold, on detection of front collision, such that
the front acceleration detection result easily exceeds the first rear collision threshold, and
the rear acceleration detection result easily exceeds the second rear collision threshold; wherein
the predetermined period is shorter than a time period between the front collision and an expected subsequent rear collision.

13. The method according to claim 12, further comprising:
setting, on detection of the front collision, a first predetermined period to be shorter than a time period between the front collision and the rear collision, which is expected to be caused subsequent to the front collision; and
changing the first rear collision threshold and the second rear collision threshold in the first predetermined period.

14. An activation device for detecting collision of a vehicle and activating a protection apparatus for protecting an occupant, the activation device comprising:
a front collision detection unit configured to
detect a front collision of the vehicle and
output a front-collision-state activation signal to a protection apparatus related to the front collision so as to activate the protection apparatus related to the front collision when detecting the front collision;
a rear collision detection unit configured to
detect a rear collision of the vehicle,
output a rear-collision-state activation signal to a protection apparatus related to the rear collision so as to activate the protection apparatus related to the rear collision when detecting the rear collision,
prohibit output of the rear-collision-state activation signal to the protection apparatus related to rear collision for a first predetermined period when the front collision detection unit detects the front collision, and
ease detection of the rear collision for a second predetermined period when the front collision detection unit detects front collision;
a collision detection unit configured to
obtain acceleration in a front direction of the vehicle as a front acceleration detection result and
obtain acceleration in a rear direction of the vehicle as a rear acceleration detection result,
wherein the front collision detection unit is further configured to
receive the front acceleration detection result from the collision detection unit and the rear acceleration detection result,
determine whether the front acceleration detection result is greater than a first front collision threshold and determine whether the rear acceleration detection result is greater than a second front collision threshold so as to determine whether the vehicle causes the front collision,
wherein the rear collision detection unit is further configured to
receive the front acceleration detection result from the collision detection unit and the rear acceleration detection result,
determine whether the front acceleration detection result is greater than a first rear collision threshold and determine whether the rear acceleration detection result is greater than a second rear collision threshold so as to determine whether the vehicle causes the rear collision,
wherein the rear collision detection unit is further configured to
change the first rear collision threshold and the second rear collision threshold, when the front collision detection unit detects the front collision, such that
the front acceleration detection result easily exceeds the first rear collision threshold, and
the rear acceleration detection result easily exceeds the second rear collision threshold; wherein
the first and second predetermined periods are shorter than a time period between the front collision and an expected subsequent rear collision.

* * * * *